Figures 4, 5, 6:
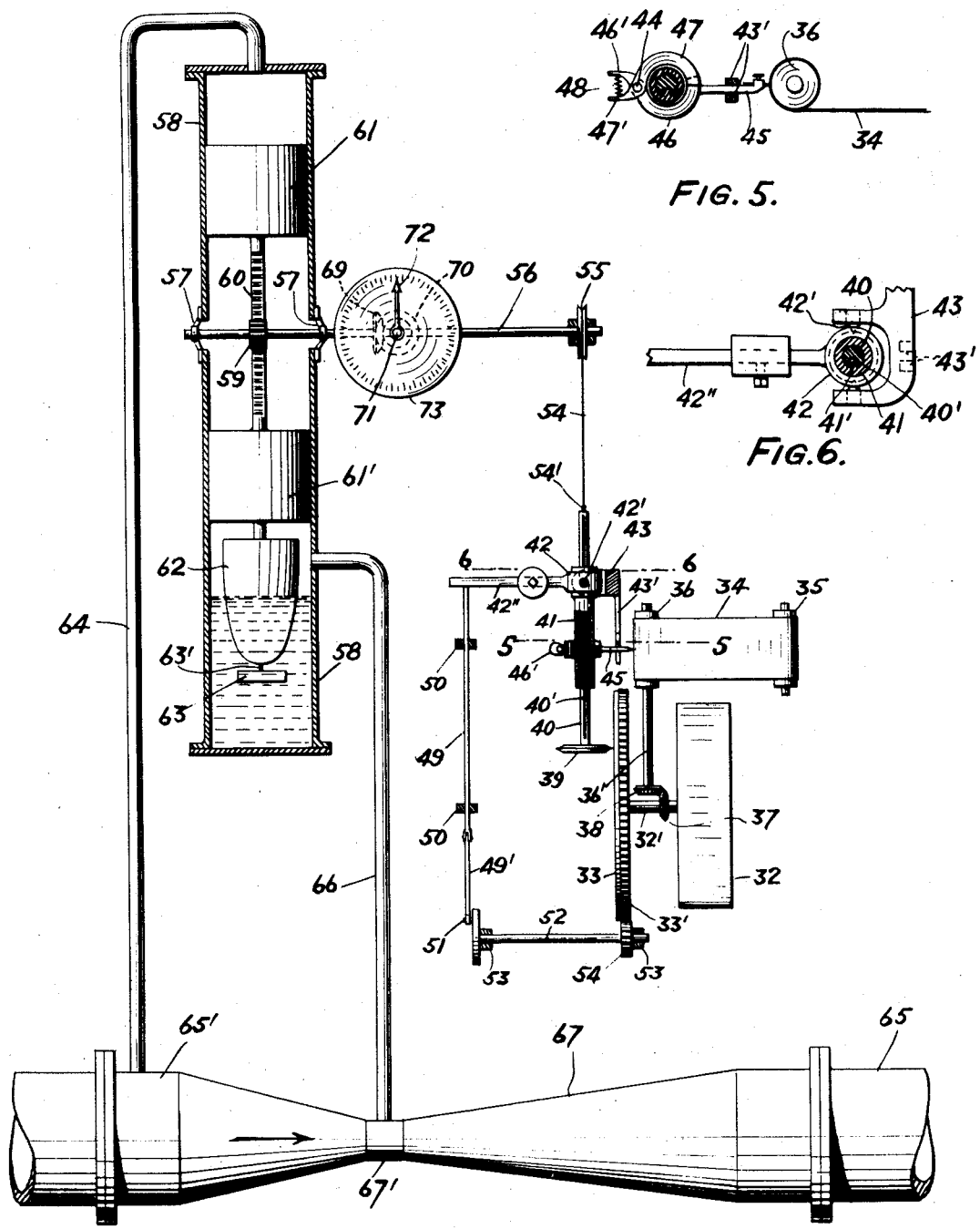

J. W. LEDOUX.
INDICATOR.
APPLICATION FILED FEB. 23, 1910.
1,041,107.
Patented Oct. 15, 1912.
2 SHEETS—SHEET 1.
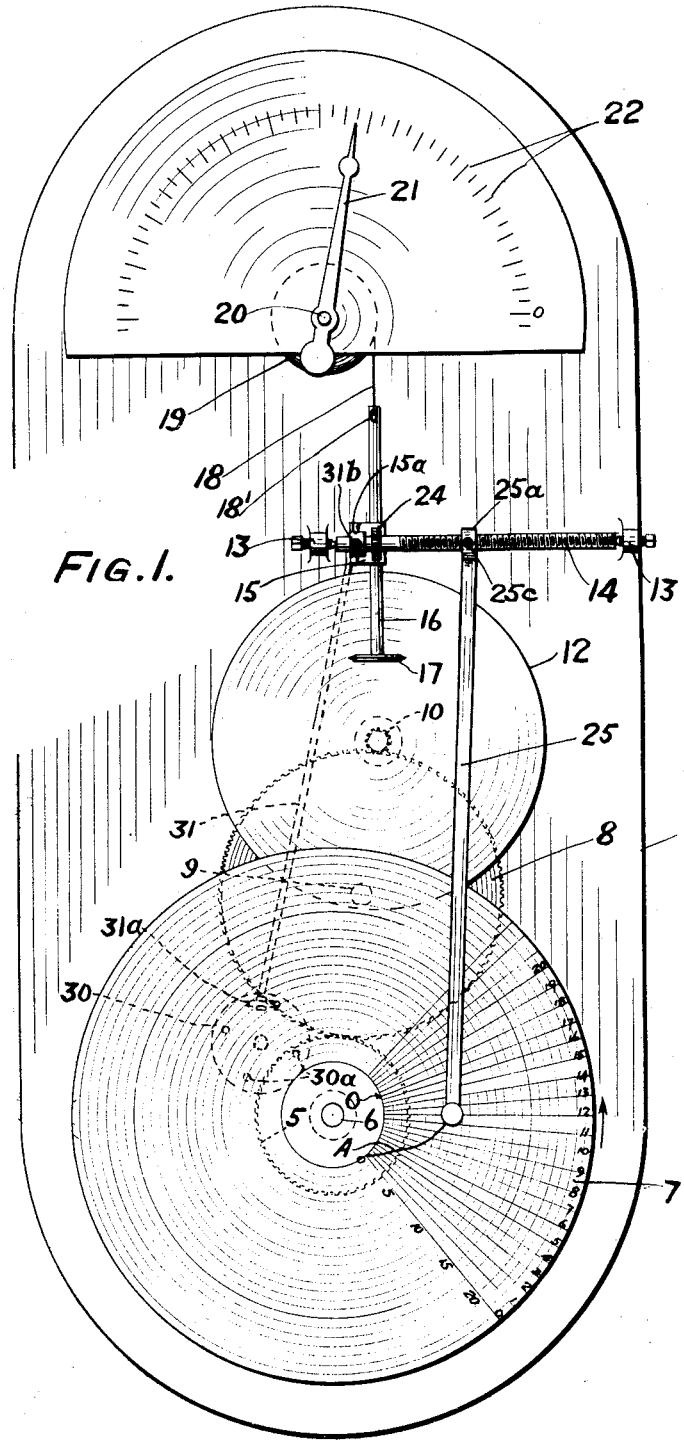
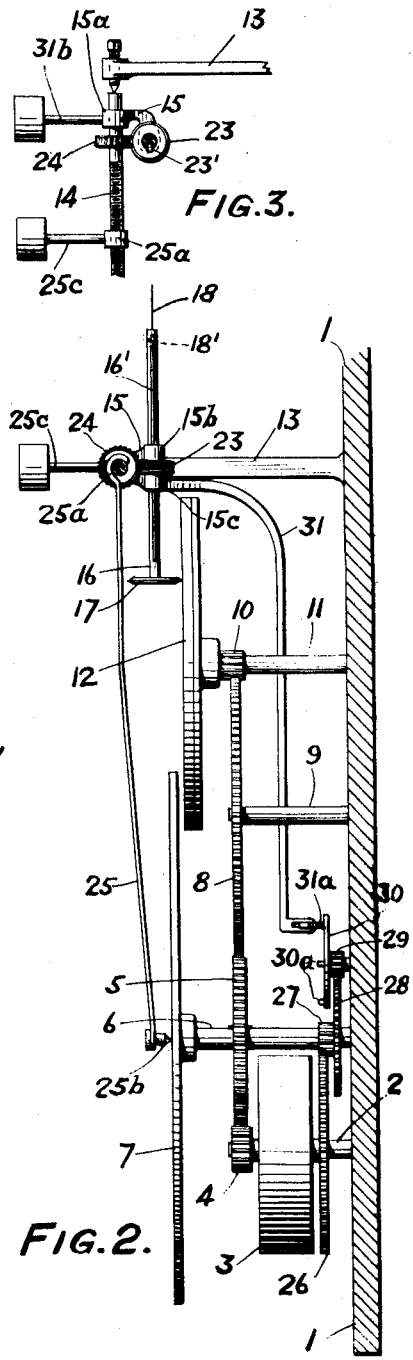
WITNESSES:
INVENTOR
John W. Ledoux
BY
Charles N. Butler
ATTORNEY.

UNITED STATES PATENT OFFICE.

JOHN W. LEDOUX, OF SWARTHMORE, PENNSYLVANIA.

INDICATOR.

1,041,107. Specification of Letters Patent. Patented Oct. 15, 1912.

Application filed February 23, 1910. Serial No. 545,374.

*To all whom it may concern:*

Be it known that I, JOHN W. LEDOUX, a citizen of the United States, residing at Swarthmore, in the county of Delaware and State of Pennsylvania, have invented an Improved Indicator, of which the following is a specification.

My invention is an indicator adapted for showing various operations involving the actions of variable forces.

It is designed primarily for showing the working of a meter, particularly for measuring the flow of fluids.

In its preferred construction it comprises a constantly revolving member having a contact surface, a wheel revolved by contact with said surface, means for moving the wheel axially so as to vary its distance from the center of revolution of the contact surface proportionately to the flow or rate to be measured, means for effecting a desired contact relation of the wheel with the surface, means for moving a marker proportionately to the revolutions of the wheel, and a constantly moving surface upon which the marker acts to indicate the flow or rate graphically.

In the drawings, Figure 1 is a front elevation of an indicator embodying my improvements; Fig. 2 is a sectional side elevation of the lower part of the mechanism shown in Fig. 1; Fig. 3 is a plan view of means for translating the marker shown in Figs. 1 and 2; Fig. 4 is a sectional elevation representing a modified form of my indicator applied to a water meter; Fig. 5 is a sectional view taken on the line 5—5 of Fig. 4, and Fig. 6 is a sectional view taken on the line 6—6 of Fig. 4.

The indicator, as illustrated in Figs. 1, 2, and 3, has the base 1 which carries, through the post 2, a clock or constant rate motor 3. A pinion 4 is driven by the clock and drives a gear 5 fixed on a revoluble arbor 6, the arbor having the record disk 7 fixed thereto and revoluble therewith. The gear 5 acts, through the idler gear 8 carried by the post 9, on the revoluble pinion 10 carried by the post 11, this pinion being fixed to and revolving the driving disk 12.

Bearings 13, fixed on the base, carry the revoluble screw shaft 14. A bearing 15 has a collar 15ª journaled on and held against movement along the shaft, and the further collars 15ᵇ and 15ᶜ in which a shaft 16 is journaled and longitudinally movable.

The shaft 16 has a traction wheel 17 fixed thereon and movable thereby radially in contact with the surface of the disk 12 between its center and periphery. The shaft 16 and the wheel 17 move axially, and radially to the disk, under control of a cord 18 having the swiveled connection 18' with the shaft. The cord is fixed to and movable under control of a sheave 19 which is fixed on a journaled shaft 20, the position of the shaft determining the position of the wheel 17 with relation to the center of the constantly rotating disk 12 and consequently determining the speed of revolution of the wheel and shaft to which it is fixed.

A pointer 21 is fixed on the shaft 20 and is movable over the dial 22 to provide a usual rate indicator.

The shaft 16 passes freely through and revolves a worm wheel 23 disposed between the collars 15ᵇ and 15ᶜ, the shaft having the channel 16' which is engaged by the feather 23' of the wheel. A worm wheel 24 is fixed on the shaft 14 and engaged by the wheel 23 whereby this shaft is revolved at a rate proportional to the rate of the wheel 17. An arm 25 is provided with the half nut 25ª which engages the screw of the rod 14 with the marker 25ᵇ which engages the surface of the revolving disk 7, and with the weighted member 25ᶜ which holds the marker in contact with the disk; the arm being translated laterally and the marker moved from a point near the center toward the periphery of the disk by the revolution of the screw shaft. It will be understood that the half nut permits the arm to be disengaged from the screw and returned to its initial position at the end of definite periods of the travel of the marker toward the periphery of the disk, so that each curve described by the marker shall represent a definite period of time.

The clock 3 drives a gear 26 which revolves a pinion 27 and a gear 28 fixed thereto, the members 27 and 28 being loose relative to the arbor 6. The gear 28 revolves a pinion 29 and a disk 30 fixed thereto, the disk being provided with the uniformly spaced peripheral studs 30ª. An arm 31 is fixed at one end to the bearing 15 and is provided at the other end with the wheel 31ª which lies in the path of the revolving studs 30ª. Consequently the disk 30, revolving at a constant rate, acts through its studs 30ª on the wheel 31ª to rock the arm 31, which is returned by a weighted member 31$^b$ fixed to the bearing. The oscillations of the arm give a slight oscillating movement to the bearing 15 and to the rod 16, whereby the contact of the wheel 17 with the disk 12 is relieved at regular intervals and objectionable wear is avoided.

As shown in Figs. 4 and 5, the clock or motor 32 revolves the disk 33 and winds the sheet 34 at a constant rate, the sheet being drawn from the roller 35 and taken up on the roller 36 by the action of the clock through the bevel gear 37 fixed on the clock's shaft 32' and the bevel gear 38 fixed on the take up roller's shaft 36'. The traction wheel 39, revoluble by contact with the surface of the driving disk 33, is fixed to a rod 40 which is movable longitudinally through and revolves the threaded sleeve 41, the sleeve having the spline 41' which engages the rod's groove 40'. This sleeve is journaled in a collar 42 which is pivotally supported by the bearing 42' carried by a bearing yoke 43.

A marker 45 has the half nut 46 fixed thereto and the half nut 47 connected therewith by the pivot 44; the parts 46 and 47 having the respective projections 46' and 47' between which is disposed the spring 48. The half nuts, through the action of the spring, are clamped on the threads of the revoluble sleeve, whereby the marker is translated parallel to the axis of the roller 36 in contact with the sheet 34 thereon, the marker being controlled by the guide 43' depending from the bearing 43.

A weighted arm 42'' is fixed to the collar 42 and acts on the sleeve 41 to hold the wheel 39 in contact with the disk 33 and the marker 45 in contact with the sheet 34. The pressure of the wheel 39 on the disk 33 is relieved at regular intervals, to avoid objectionable friction, by periodically lifting the arm 42'' through the action of the rods 49 which is adapted to reciprocate in the guides 50. This rod, to effect its reciprocation, is connected by the link 49' with the eccentric 51 fixed to and revolved by the shaft 52 which is journaled in the bearings 53, the shaft being driven by a pinion 54 fixed thereon which engages the gear 33' carried by the revolving disk 33.

The shaft 40 moves through the sleeve 41, to move the wheel 39 radially with reference to the disk 33, under control of the cord 54 which is connected therewith by the swivel 54' and is connected with the sheave 55 fixed on the shaft 56. This shaft is journaled in bearings 57 of a compound cylinder or casing 58 and has fixed thereon a pinion 59. A rack 60 engages the pinion 59 and connects the piston heads 61 and 61' which are adapted to reciprocate in the opposite ends of the cylinder or casing 58. A tapered float 62 is fixed to the head 61' and is immersed to a greater or less depth in a liquid (as mercury) heavier than that to be measured and contained in the bottom of the casing. A buoyant device 63 is connected to the point of the float by a slender connection 63' and serves as a counter-balance for the weight of mechanism to be counter-balanced so that the point of the float will merely touch the mercury when the pressures upon the respective heads is substantially the same.

The top of the casing 58, above the head 61, is connected by a pipe 64 with a normal section 65' of a conduit 65, and the lower part of the casing, between the mercury and the head 61', is connected by a pipe 66 with the throat 67' of the conduit's Venturi section 67.

The shaft 56 has fixed thereon a bevel gear 69 which engages a bevel gear 70 on a shaft 71, the latter having a pointer 72 thereon which moves over the dial 73 to provide a rate indicator.

It will be understood that the meter shown in Fig. 4 is applicable to the operation of the shaft 20 and the mechanism depending thereon as shown in Fig. 1.

In operation, when there is no flow in the conduit, the pressures communicated from liquid therein through the pipes 64 and 66 to the piston heads 61 and 61' will be the same, the float will stand at its greatest elevation with its apex touching the surface of the mercury, the pointer will indicate no flow on the dial, the traction wheel will be stationary at the center of the disk, and the marker will indicate no flow upon the record disk or sheet, in either form of the mechanism. As the flow in the conduit rises from zero to the maximum, the resultant of the pressures communicated through the pipes to the piston heads carries the latter downward against the gradually increasing resistance due to the displacement of mercury by the descending float which is shaped so that the counter-balancing force due to the displacement will be a simple ratio of the flow to effect a movement which is measured. The movement of the compound piston, communicated through the intermediate mechanism, withdraws the traction wheel from the center toward the periphery of the driving disk so that the screw is revolved and the marker is translated thereby at a gradually increasing rate, the marker recording upon the record disk or sheet the flow for the definite period of time for which the apparatus is designed.

It will be evident, from the foregoing operations, that the revolutions of the traction wheel bear a simple ratio to the total flow, which is thus integrated, and that the results are so charted by the marker upon the recording surface that the flow during a definite period of time will be indicated by the distance from a datum line O of the charted curve A corresponding to the lapse of such period. It will also be evident that the angular deviation of the charted curve from the curve through which it is passing, as in Fig. 1, will indicate the rate of flow at the particular instant.

Having described my invention, I claim:

1. In an indicator, a revoluble device, a constant rate motor for driving said device, a wheel revoluble by contact with a surface of said device, means for moving said wheel axially to vary its position with relation to the axis of revolution of said device, said means comprising an axial shaft fixed to said wheel and differential pressure mechanism for moving said shaft, a threaded member through which said shaft is movable, means whereby said shaft revolves said member, a marker, and means whereby said threaded member moves said marker at a rate proportional to the rate of said wheel.

2. In an indicator, a revoluble device having a surface of revolution, means for revolving said device at a constant rate, a traction member revoluble by contact with said device, a shaft fixed to said member, means for moving said shaft longitudinally to vary the position of said member with relation to the axis of said device, a journaled device through which said shaft is movable, means whereby said shaft revolves said device, a marker, means whereby said journaled device moves said marker, and means for receiving a record from said marker.

3. In an indicator, a revoluble device having a surface of revolution, means for revolving said device at a constant rate, a shaft substantially parallel to an element of said device, a traction member fixed to said shaft, a journaled member having a thread thereon through which said shaft is movable, means whereby said shaft revolves said member, a marking device, means whereby said thread translates said marking device, means for receiving a record from said marking device, and mechanism for moving said means last named at a constant rate.

4. In an indicator, a driving device having a surface of revolution revoluble at a constant rate, a traction wheel revoluble by contact with the surface of said device, means for moving said wheel axially parallel to an element of said surface, and means for intermittently relieving the pressure of said wheel on said surface.

5. In an indicator, a member having a surface of revolution, means for revolving said member about the axis of said surface at a constant rate, a wheel normally engaging said surface, an axial shaft fixed to said wheel and disposed substantially parallel to an element of said surface, means for moving said shaft longitudinally whereby said wheel is moved to positions on said surface of different distance from the axis of revolution, and means for oscillating said shaft and wheel.

6. In an indicator, a revoluble member having a surface of revolution, means for revolving said member at a uniform rate, a wheel revolved by contact with said surface, an axial shaft fixed to said wheel and movable longitudinally to vary the distance of the point of contact of said wheel from the axis of revolution of said member, a journaled device through which said shaft is movable and by which it is revolved, means for rocking said device to relieve the contact of said wheel on said surface, an indicating member, and means operated by said device for moving said indicating member.

7. In an indicator, means adapted for receiving a record, a revoluble device having a surface of revolution, a motor, mechanism whereby said motor moves said means and said device, a traction wheel revoluble by contact with said surface, an axial shaft fixed to said wheel, a pivoted bearing in which said shaft is journaled and through which it is movable longitudinally, mechanism movable by said motor, and means whereby said mechanism last named rocks said pivoted bearing.

In witness whereof I have hereunto set my name this 19th day of February, 1910, in the presence of the subscribing witnesses.

JOHN W. LEDOUX.

Witnesses:
ROBERT JAMES EARLEY,
JOS. G. DENNY, Jr.